March 26, 1929.  E. HOPKINSON  1,707,014
TIRE AND PROCESS OF MAKING SAME
Filed Aug. 17, 1923
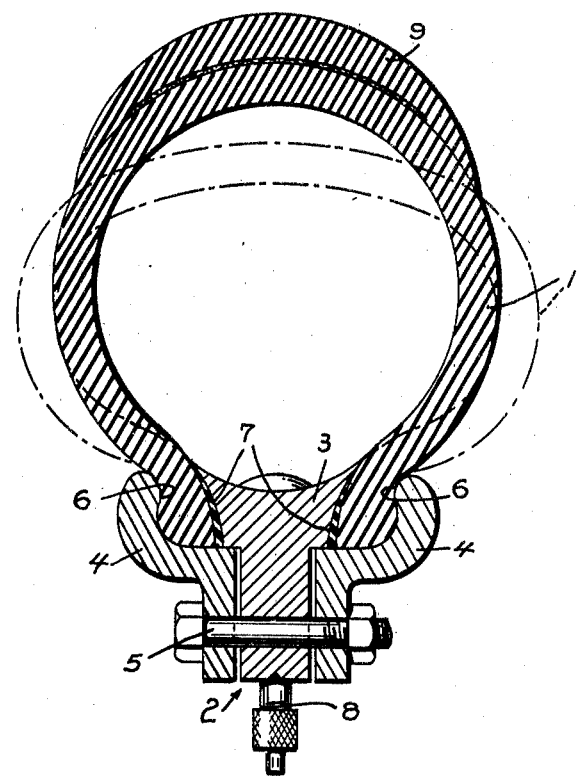
Fig. 2.
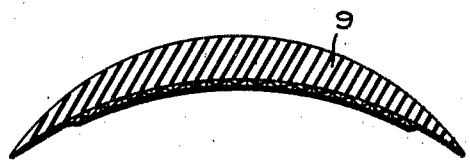
WITNESS:  Fig. 1.  INVENTOR.

Patented Mar. 26, 1929.

1,707,014

UNITED STATES PATENT OFFICE.

ERNEST HOPKINSON, OF NEW YORK, N. Y.

TIRE AND PROCESS OF MAKING SAME.

Application filed August 17, 1923. Serial No. 657,850.

This invention relates to pneumatic tire casings and method of and apparatus for making same.

In the carrying out of the invention the carcass is formed in any desired manner and vulcanized previous to building the tread thereon. The tread is likewise formed and vulcanized preferably independently of the carcass and of an appreciably less diameter than it will finally assume in the finished tire.

In the accompanying drawings illustrating an embodiment of my invention,

Fig. 1 is a cross-sectional view of a tread, and

Fig. 2 is a cross-sectional view of the tread applied to the carcass and the apparatus for applying it.

The carcass 1, which has previously been constructed and vulcanized in any convenient manner, is mounted on a support 2 composed of the central ring 3 and the side rings 4—4 secured together and to the central ring by means of the bolts 5. The rings 3 and 4 co-operate to form grooves 6 for engaging the edges of the tire and gaskets 7 may be provided to better seal the interior of the tire. A valve stem 8 of usual construction extends through the ring 3 to provide means for inflating the tire.

The carcass 1 being secured to the rings, the air within is exhausted pereferably until a partial vacuum is established, thereby causing the carcass to partially collapse into a flattened position illustrated by the dash and dotted lines in Fig. 2. This reduces the girth of the carcass so that the undersized tread 9 which has been previously built and cured, may be easily slipped over into place, one or both of the contacting surfaces of the carcass and tread being first coated with an adhesive material as desired, preferably with a cement containing an accelerator, such as oxy normal butyl thiocarbonic acid disulphide, vulcanizing at low temperatures or on short heat treatments. The valve 8 is then opened and air pumped into the carcass until it is inflated to the desired extent to bring the contacting surfaces of the carcass and tread into intimate contact. This inflation of the tire will produce a stretching of the tread, which as before remarked is made somewhat reduced in diameter. This stretching produces considerable tension in the tread which results in causing a close fitting of the tread to the carcass and enables the cement to firmly hold the two together.

While I have described by invention in connection with the building of new tires, it will be found equally valuable in retreading old carcasses. In such instances the portion of the old tread still remaining is removed from the carcass, the carcass buffed down to give it the required surface and then the new undersized tread applied in the manner already described.

In either case, whether the tread is secured to an old or a new carcass the resulting tire will be composed of a preferably separately vulcanized carcass and tread, the tread being held firmly to the carcass by the cement in a stretched condition. The process is especially desirable in retreading a green tread on to the old carcass which ordinarily necessitates subjecting the carcass to the heat used in vulcanizing the green tread in place upon the carcass. An overcure of the carcass results with consequent weakening thereof.

While I have described the carcass as being deflated by establishing a partial vacuum to facilitate placing the tread in position, this may be accomplished by simply opening the interior of the carcass to the atmosphere, or the tread may be applied to the carcass before the latter is mounted upon the support 2, and in fact other modifications and changes may be resorted to without departing from the spirit of my invention, the foregoing describing only a preferred method and apparatus for securing the carcass and tire together.

Having thus described my invention, what I claim as new and desire to protect by Letters Patent is:—

1. A pneumatic tire casing comprising a carcass and a tread each containing vulcanized rubber, the tread being secured to the carcass in a normally stretched condition.

2. The method of building tires which consist in separately forming and vulcanizing to completed condition a carcass and undersized tread, decreasing the circumference of the carcass and encircling it with the tread, and expanding the carcass with the tread thereon until the tread is stretched to the normal outer circumference of the carcass.

3. The method of building tires which consists in separately forming and vulcanizing to completed condition a carcass and undersized tread, collapsing the carcass to permit the tread to be placed thereon, interposing adhesive material between the carcass and tread, and securing the tread to the carcass by expanding the carcass and tread until the tread is stretched to the normal diameter of the carcass.

Signed at New York, New York, this 15th day of August, 1923.

ERNEST HOPKINSON.